April 27, 1943. W. L. GROENE 2,317,854
FRICTION TRANSMISSION GEARING
Original Filed June 6, 1941 4 Sheets-Sheet 1
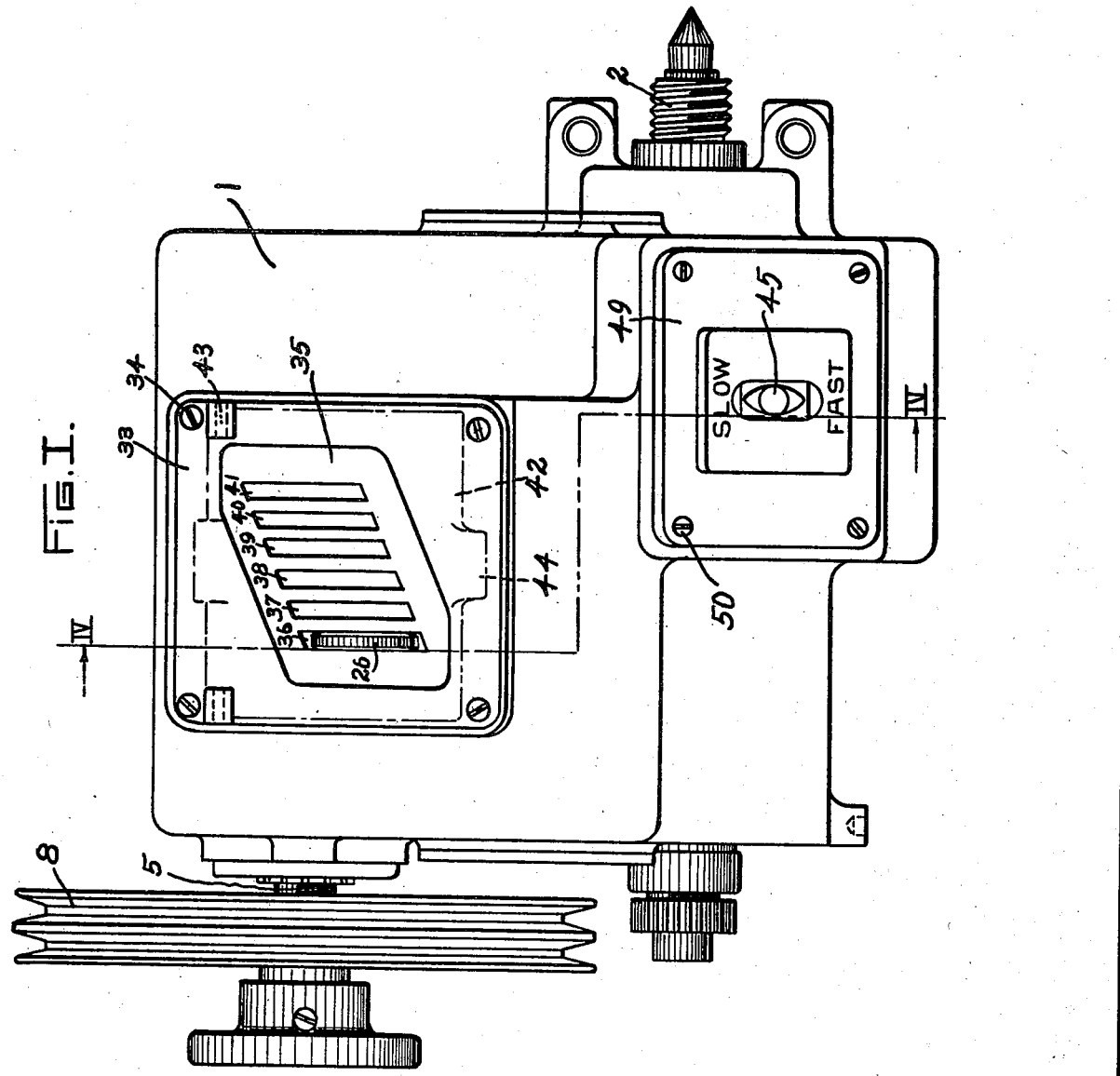
INVENTOR.
BY Willard S. Groene

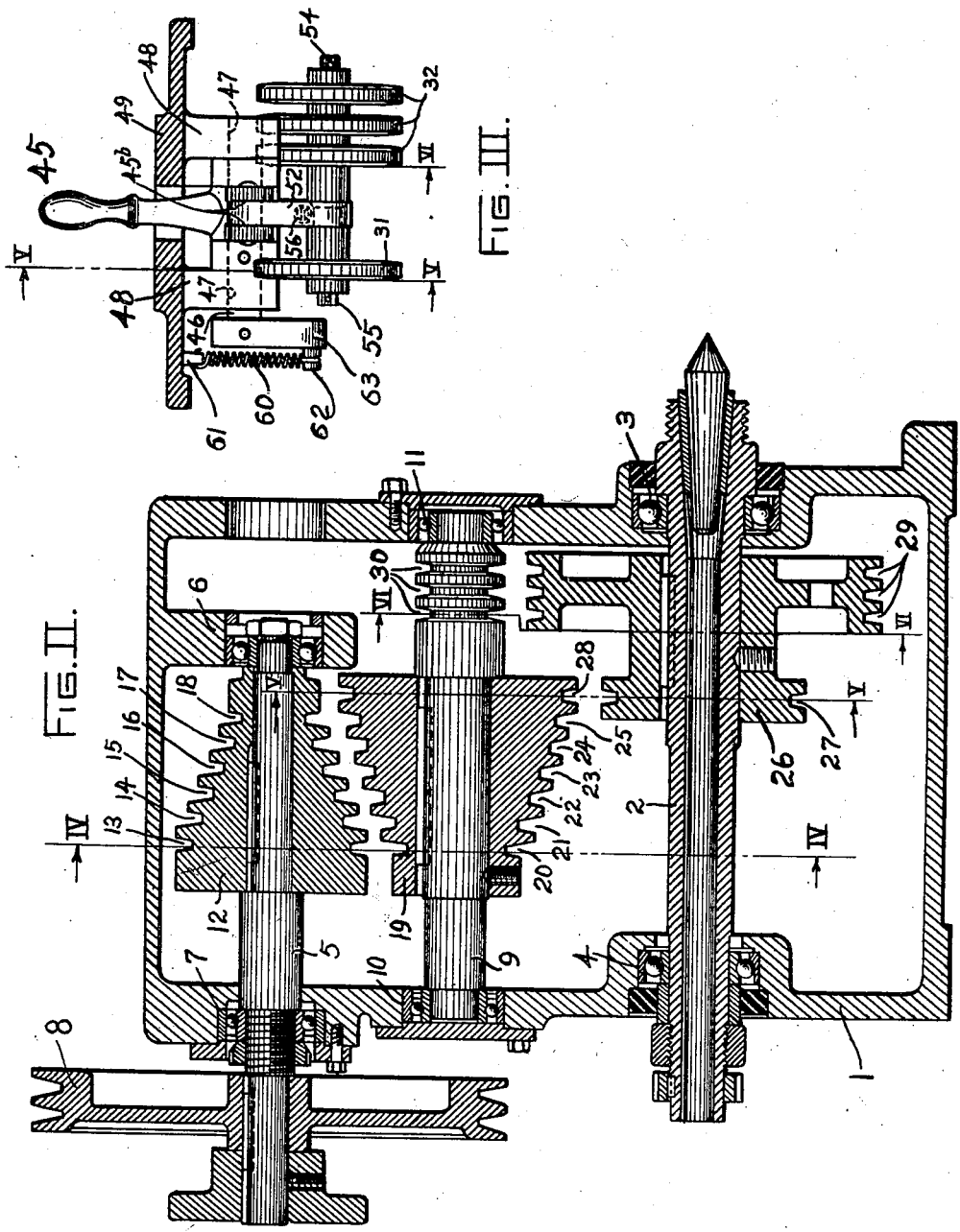

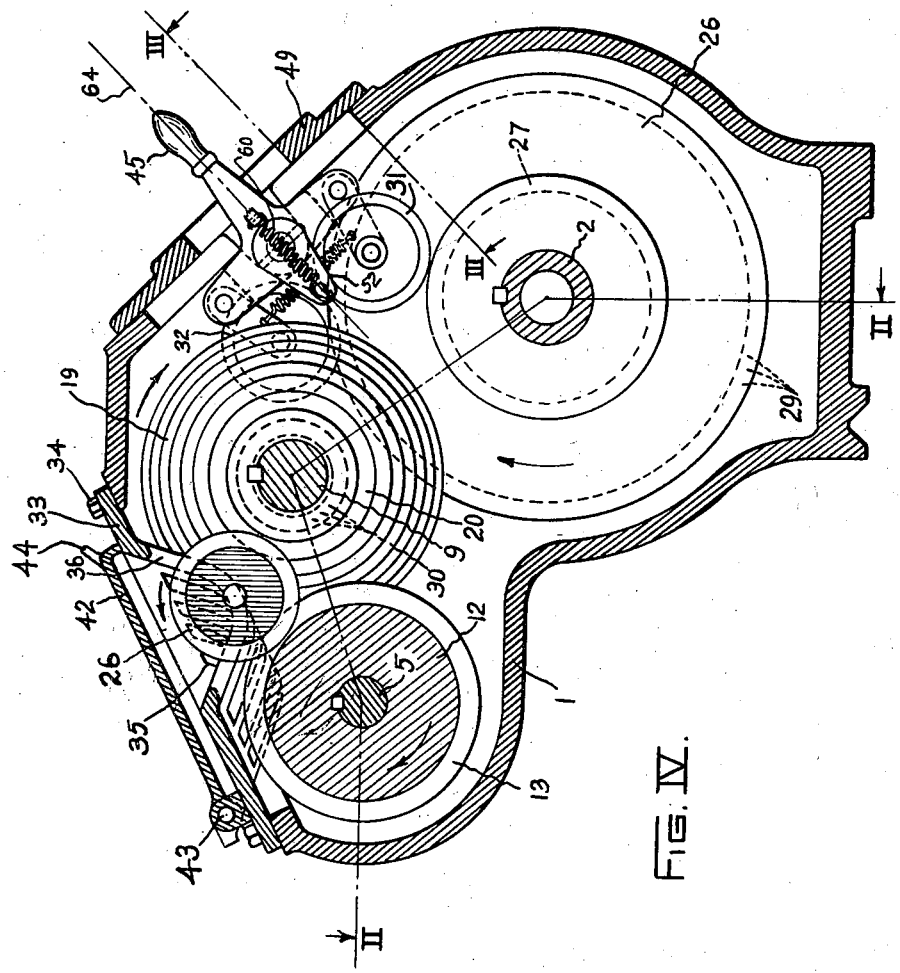

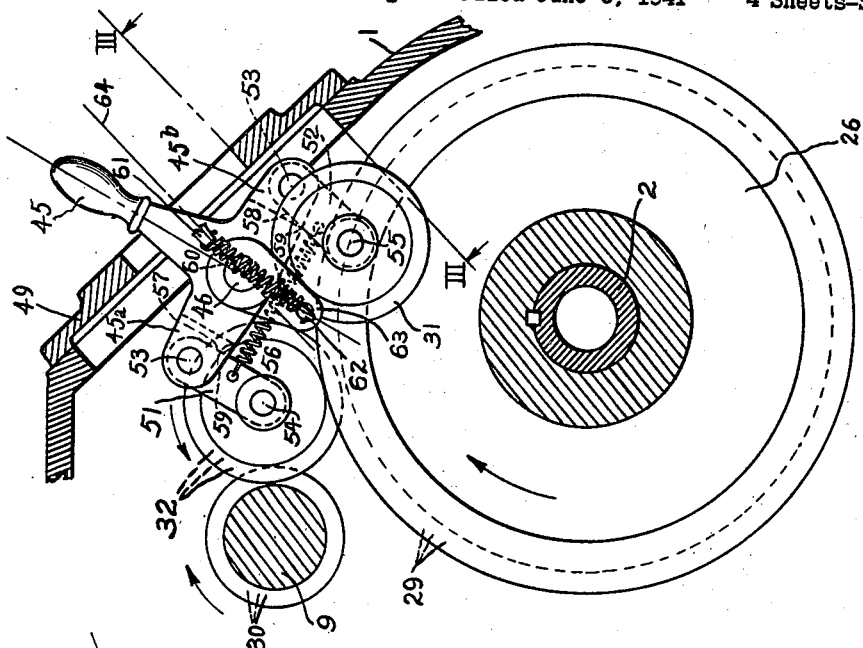
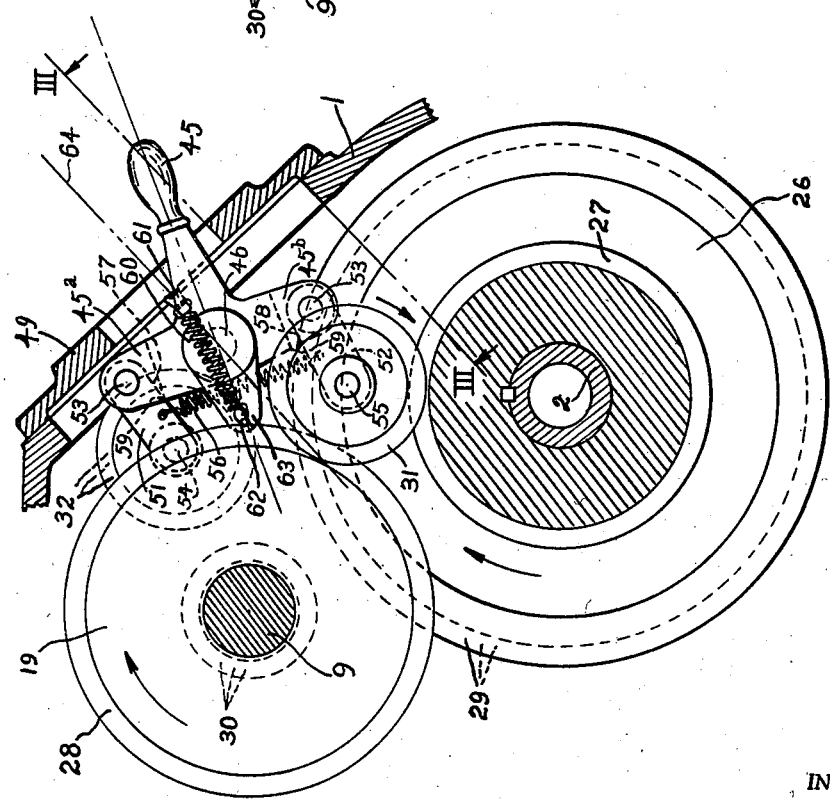

Patented Apr. 27, 1943

2,317,854

UNITED STATES PATENT OFFICE 2,317,854

FRICTION TRANSMISSION GEARING

Willard L. Groene, Cincinnati, Ohio, assignor to The R. K. LeBlond Machine Tool Company, Cincinnati, Ohio, a corporation of Delaware Original application June 6, 1941, Serial No. 396,957. Divided and this application September 8, 1942, Serial No. 457,645

4 Claims. (Cl. 74—190)

This is a divisional application of copending application Serial Number 396,957, filed June 6, 1941.

In designing and building lathe headstock transmissions, it has always been a problem to provide a change speed transmission for driving the work spindle which was capable of operation over a very wide range of speeds and that when it was operating in the relatively high range of speeds, it was substantially free from objectionable noise and vibration. And it has also been a major problem in designing such transmissions to provide driving means which did not cause chatter marks on the work such as is ordinarily caused by gear transmission mechanism.

It is therefore the primary purpose of this invention to provide a friction transmission particularly for a lathe headstock capable of providing a large range of speeds and capable of operating silently at relatively high speeds, while at the same time providing a smooth chatter-free drive to the work spindle of the lathe. In this way the work may be rapidly finished at high speed while at the same time providing a high degree of surface finish free of chatter marks and other imperfections ordinarily caused by the driving action of former transmissions.

One of the objects of this invention is to provide in a lathe headstock transmission having a rotatable work spindle, a series of V-disc power transmitting members having variable speed ranges which may be selected as desired to effect a complete range of speeds for such a transmission for all types of work to be performed on the lathe.

Another object of the invention is to provide in a lathe headstock transmission having a rotatable work spindle, a motor driven input shaft, and an intermediate shaft, a V-disc sheave and driving disc transmission between the input shaft and the intermediate shaft and also a V-disc back gear and high speed driving connections between the intermediate shaft and the work spindle.

Another object of this invention is to provide novel means for effecting the selection of the V-disc change speed drives desired between the input shaft, intermediate shaft, and work spindle.

A further object of this invention is to provide in a headstock transmission, a relatively high speed drive in which a single disc is utilized between the driving disc and driven disk on the work spindle and also to provide a back gear drive between the intermediate shaft and the face sheave on the work spindle, said back gear disc arrangement preferably incorporating a plurality of discs and sheaves so as to effect adequate driving action at relatively slow speed for the work spindle under heavy cut.

A further object of this invention is to provide in the headstock transmission incorporating the high and low speed drive between the intermediate shaft and the work spindle, an automatic means for engaging one or the other of said set of discs to effect the high speed or slow speed operation of said work spindle.

Further features and advantages of this invention will appear from the detailed description of the drawings in which:

Figure I is a plan view of the novel transmission incorporated in a lathe headstock, particularly showing the disc tray for controlling the primary speed changes for the freely operating disc and also the slow and fast feed control lever mechanism for rapidly changing from high speed to back gear drive for the work spindle of the headstock.

Figure II is a section through the headstock transmission on the line II—II of Figure IV, particularly showing the input drive shaft, the intermediate shaft, and the work spindle, and the various V-groove driving sheaves mounted thereon.

Figure III is a fragmentary sectional view of the control mechanism for the driving discs for effecting the high or back gear or low speed drive to the work spindle, as shown on the line III—III of Figures IV, V, and VI.

Figure IV is a transverse section through the headstock transmission shown on the line IV—IV of Figures I and II.

Figure V is an enlarged fragmentary section on the line V—V of Figure II, particularly showing the position of the high and back gear driving disc control mechanism when positioned for high speed driving of the work spindle.

Figure VI is a similar fragmentary view to that of Figure V, but shown on the line VI—VI of Figure II, showing the position of the high and back gear driving disc control mechanism when positioned for the slow speed or back gear driving of the work spindle.

This invention is shown applied to a typical lathe headstock having the housing 1 in which is journaled the work spindle 2 in suitable bearings 3 and 4. Also journaled in the headstock housing 1 is the input drive shaft 5 journaled in suitable bearings 6 and 7 and having the driving pulley 8 which is suitably driven from an appropriate electric driving motor (not shown). An intermediate or back gear drive shaft 9, journaled in suitable bearings 10 and 11, is also provided in the headstock housing 1.

On the input drive shaft 5 is fixed the conical driving sheave 12 having a series of V-grooves 13, 14, 15, 16, 17, and 18 of various different diameters. On the intermediate shaft 9 is fixed the conical sheave 19 positioned oppositely to that of the sheave 12 so that its smallest diameter is adjacent the largest diameter of the sheave 12 and vice versa, and it has a series of V-grooves 20, 21, 22, 23, 24, and 25, which are aligned with the respective grooves 13 to 18 inclusive, of the conical sheave 12.

Shafts 5 and 9 are positioned with their axes lying substantially in a horizontal plane so that a driving disc 26 may be placed in any of the respective aligned pairs of V-grooves of the conical sheaves 12 and 19 and will operate therein so that driving power from the shaft 5 may be transmitted through the driving disc to the intermediate shaft 9. By appropriately placing the driving disc 26 in any of the respective aligned grooves different rates of relative rotation may be effected in the intermediate shaft 9 with constant speed of rotation for the shaft 5. In this way a series of primary speed changes, six in number in this particular instance, are provided for the intermediate shaft 9.

On the work spindle 2 is fixed the driving sheave 26, which has a high speed groove 27 arranged in alignment with a groove 28 formed in the conical sheave 19 on the intermediate shaft 9. Also on this sheave 26 is formed the large diameter face sheave comprising the three grooves 29, which are arranged in alignment with the three grooves 30 formed in the intermediate shaft 9. A driving disc 31 is arranged to be engaged with the grooves 27 and 28 so as to provide relatively high speed driving of the work spindle 2 from the sheave 19 on the intermediate shaft 9. A series of three driving discs 32 are provided for engagement with the grooves 29 and 30 so as to effect relatively low speed high torque powerful driving of the work spindle from the intermediate shaft 9.

Referring particularly to Figures I and IV, in order to facilitate placing of the driving disc 26 in the desired V-grooves in the conical sheaves 12 and 19, a disc tray 33 is provided which is mounted on the top rearward portion of the headstock 1 by suitable screws 34. This disc tray is formed with a V shaped trough portion 35 which extends angularly relative to the axes of rotation of the sheaves 12 and 19 and substantially parallel to the peripherial surfaces of the conical sheaves where they face each other. Through this V-shaped trough 35 is formed a series of disc slots 36, 37, 38, 39, 40, and 41 each appropriately aligned with the pairs of slots 13—20, 14—21, 15—22, 16—23, 17—24, and 18—25 of the sheaves 12 and 19 and in which the disc 26 may be selectively placed to effect the appropriate desired drive from the shaft 5 to the shaft 9.

Over the top of this V-shaped trough 35 is provided a suitable cover 42 mounted on a suitable hinge 43 which is arranged to be swung open when selecting the various slots in which to place the disc 26 by a suitable handle 44 provided on the cover. This cover serves to keep the trough 35 free of dust and dirt and other foreign matter and also serve in certain instances of high speed driving and intermittent cutting in the lathe, to keep the disc from jumping out of the slots 36 to 41, inclusive, under these severe working conditions. It is to be understood, however, that normally the disc 26 operates with no guiding or locating assistance from the disc tray 33. The sides of the various slots 36 to 41, inclusive, are appropriately made sufficiently wide to allow the free rotation of the disc 26 without contacting the side portions of these slots. It is also to be noted that the disc 26 projects into the trough 35 a convenient and sufficient amount to enable easy access of the fingers of the operator in lifting the disc out and in placing it in any of the other slots with a minimum of effort on the part of the operator. It has been found in practice that this particular change speed driving mechanism is extremely rapid and efficient, it being merely necessary to pick out the disc and drop it in any of the slots 36 to 41, inclusive to effect the necessary different speed change drive between the shafts 5 and 9.

Referring particularly to Figures III, IV, V, and VI, unique apparatus is provided for alternately presenting the driving disc 31 in engagement with the sheaves 27—28 and the multiple driving discs 32 in driving relation with the sheaves 29—30. This apparatus comprises a shifting lever 45 which is fixed on a rock shaft 46 journaled in suitable bearings 47 in projecting lugs 48 formed in the inner side of a cover plate 49 appropriately mounted on the front portion of the headstock by suitable screws 50, as best seen in Figure I. Projecting outwardly from the lever 45 are the bifurcated arms 45a and 45b from which are carried the links 51 and 52 connected thereto by suitable pins 53. On the link 51 is fixed a stud shaft 54 upon which is journaled the multiple driving discs 32 in appropriate spaced relationship to properly enter the multiple grooves 29—30. On the link 52 is provided the stud shaft 55 on which is appropriately journaled the driving disc 31 in proper alignment with the grooves 27—28. Interconnected between the links 51 and 52 is a relatively light tension spring 56 which normally draws the links 51 and 52 toward each other until their surfaces 57 and 58 contact the edges 59 of the bifurcated portions of the arm portions 45a and 45b of the control lever 45. The purpose of this tension spring 56 is to keep the links and their respective driving discs in approximate oriented position with respect to the lever 45 and their respective driving sheaves they are to be engaged with, the spring forming no function toward maintaining contact of the driving discs with the sheaves, which action takes place automatically due to the driving action and rotation of the various driving and driven sheaves.

It will thus be seen that by moving the lever 45 downwardly, as shown in Figure V, the disc 31 is engaged with the sheaves 27 and 28, the tension spring 56 slightly extending itself so that the surface 58 of the link 52 will be relieved from contact with the edge 59 of the lever arm 45 to permit free movement of the roller 31 with respect to the two sheaves it is engaged with. Likewise, in moving levers 45 upwardly as shown in Figure VI, the multiple disc 32 will be engaged with the respective sheaves 29 and 30, again the tension spring 56 slightly extending itself so as to permit the free floating movement of the link 51 independent of the edge 59 of the lever arm 45a.

In order to automatically hold the lever in either of the above mentioned positions of engagement of the disc 31 or discs 32, an offset spring arrangement is provided which consists of a tension spring 60 connected at one of its ends to a lug 61 formed on the cover plate 49 and is connected at its other end to a pivot pin 62 carried in the outer end of a lever arm 63 fixed on the rock shaft 46. It will thus be noted particularly in referring to Figures IV, V, and VI, that when in the neutral position, as shown in Figure IV, the spring will be in its greatest extended position and that in swinging the lever to either side of the central line 64, the spring can shorten itself resulting in automatically tending to hold the lever 45 in either of the slow or fast positions shown in Figures V and VI.

Having thus fully set forth and described my invention what I claim as new and desire to secure by United States Letters Patent is:

1. In a transmission mechanism having a driven shaft and a drive shaft, pairs of different diameter V-groove sheaves on said shafts, driving discs engageable with each pair of said sheaves, and means for selectively engaging each of said driving discs with its respective pair of sheaves comprising a lever pivotally mounted on the frame of the transmission, projecting arms associated with said lever, links depending from the outer ends of said arms, discs journaled on the outer ends of said links, resilient means for urging the outer ends of said links and said discs normally toward each other, and means for automatically effecting rocking of said arms in either direction of pivoting so as to maintain initial engagement of the driving disc moved into engagement of its respective sheave by manipulation of said lever.

2. In a transmission mechanism having a drive shaft and a driven shaft, a pair of driving members on each of said shafts, a driving disc for each of said pairs of driving members, and means for alternately presenting one or the other of said driving discs to said driving members on said shafts, comprising a swinging control lever movable in the plane perpendicular to the axis of rotation of said shafts, arms projecting from said control lever in diametrically opposite directions relative to the point of pivoting of said handle, links depending from the ends of said projecting arms, said discs being journaled on the ends of said links so that swinging of said handle alternately presents one or the other of said discs to their respective driving members on said shafts, and resilient means for normally drawing said depending links and discs toward each other.

3. In a transmission mechanism having a drive shaft and a driven shaft, a pair of driving members on each of said shafts, a driving disc for each of said pairs of driving members, and means for alternately presenting one or the other of said driving discs to said driving members on said shafts, comprising a swinging control lever movable in the plane perpendicular to the axis of rotation of said shafts, arms projecting from said control lever in diametrically opposite directions relative to the point of pivoting of said handle, links depending from the ends of said projecting arms, said discs being journaled on the ends of said links so that swinging of said handle alternately presents one or the other of said discs to their respective driving members on said shafts, and resilient means for normally drawing said depending links and discs toward each other, dead center means associated with said swinging lever to effect its normal movement either to one extreme of its rocking motion or to the other extreme of its rocking motion so as to normally initially engage one or the other of said discs with their respective driving members on said shafts.

4. In a transmission mechanism having a drive shaft and a driven shaft, a pair of driving members on each of said shafts, a driving disc for each of said pair of driving members, and means for alternately presenting one or the other of said driving discs to said driving members on said shafts, comprising a swinging control lever movable in the plane perpendicular to the axis of rotation of said shafts, arms projecting from said control lever in diametrically opposite directions relative to the point of pivoting of said handle, links depending from the ends of said projecting arms, said discs being journaled on the ends of said links so that swinging of said handle alternately presents one or the other of said discs to their respective driving members on said shafts, and resilient means for normally drawing said depending links and discs toward each other, dead center means associated with said swinging lever to effect its normal movement either to one extreme of its rocking motion or to the other extreme of its rocking motion so as to normally initially engage one or the other of said discs with their respective driving members on said shafts, said dead center mechanism comprising a lever connected to rock with said swinging control lever having a pin, a spring connected to said pin, and fixed to a portion of the machine frame carrying said shafts, said spring being so positioned that the pin on said lever will either be to one side or the other side of a plane passing through the axis of pivoting of said handle and the point of mounting of said spring on the frame of said machine.

WILLARD L. GROENE.